Nov. 5, 1940.	H. L. M. J. DE PLACE	2,220,513
DIFFERENTIAL
Filed May 27, 1939	3 Sheets-Sheet 1
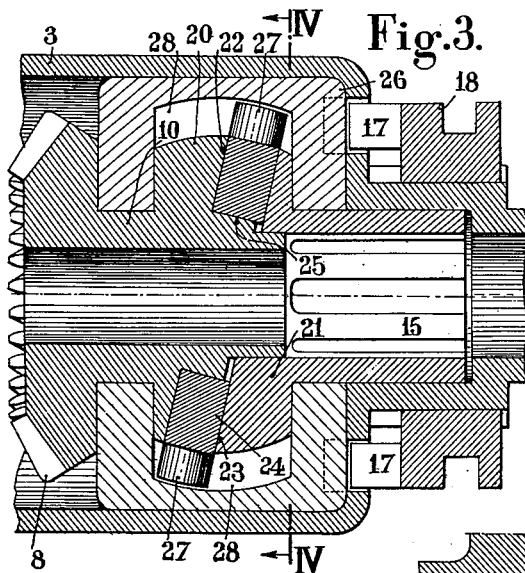
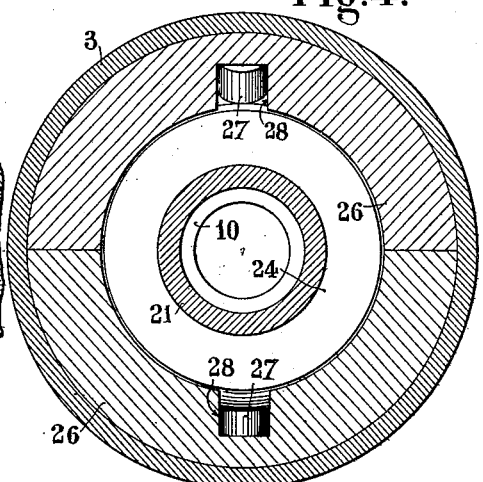
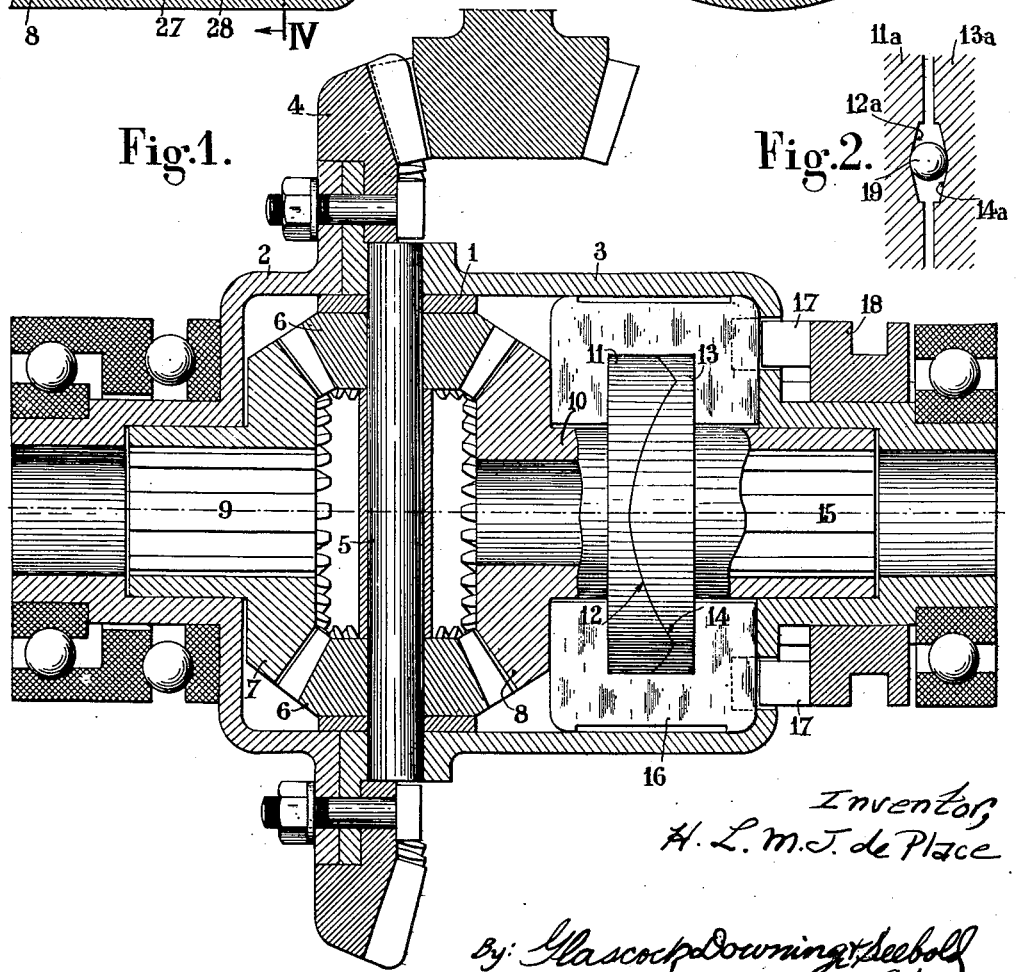
Inventor,
H. L. M. J. de Place
By: Glascock Downing & Seebold
Attys.

Nov. 5, 1940.   H. L. M. J. DE PLACE   2,220,513
DIFFERENTIAL
Filed May 27, 1939   3 Sheets-Sheet 2

Nov. 5, 1940.   H. L. M. J. DE PLACE   2,220,513
DIFFERENTIAL
Filed May 27, 1939   3 Sheets-Sheet 3
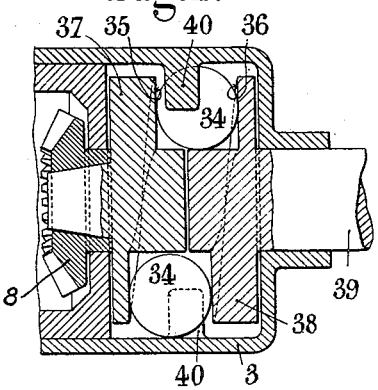
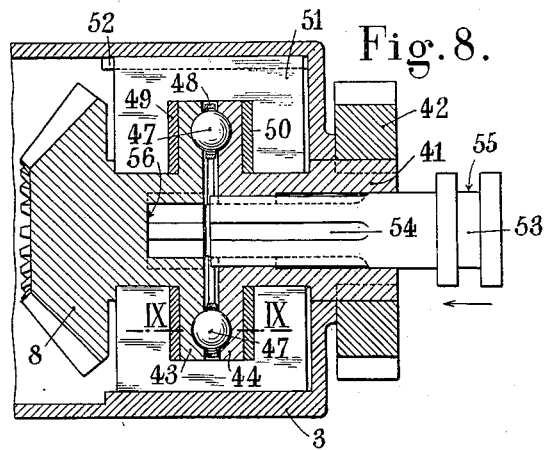
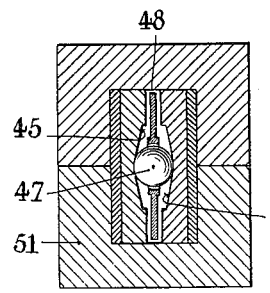
Inventor,
H. L. M. J. De Place
By: Glascock Downing & Seebold
Attys.

Patented Nov. 5, 1940

2,220,513

UNITED STATES PATENT OFFICE 2,220,513

DIFFERENTIAL

Henri Leon Marie Joseph de Place, Paris, France

Application May 27, 1939, Serial No. 276,182
In France June 3, 1938

14 Claims. (Cl. 74—315)

The present invention has for its object improvements in differentials with a view of rendering them irreversible, either permanently, or only at will, by means of devices which are simple, rugged and only slightly liable to wear.

Certain differentials have already been proposed comprising devices which absorb the reactions tending to cause one or the other of the driven shafts to rotate more rapidly than the driving planet pinion-carrier, in other words tending to cause the shaft of one of the wheels to rotate more rapidly than the casing of the differential when a motor vehicle is under consideration.

It results therefrom that if only one of the wheels rests on slippery ground, it does not risk slipping which would cause the opposite wheel to be held stationary; the wheels therefore cease to be moved by the motor as long as they tend to rotate by themselves more rapidly than the casing of the differential.

This result is usually obtained by means of members transmitting the stresses either by points or by lines of contact and consequently liable to wear more rapidly even when they are made of very hard and costly materials.

This inconvenience is so much the more apparent as said members usually cooperate in producing the differential movement proper. They are therefore compelled to work even when the conditions of utilisation do not render the presence of irreversible devices desirable.

The present invention is adapted to prevent a prejudicial operation of ordinary differentials whilst however avoiding the disadvantages of the irreversible differentials already proposed or of the locking devices of differentials.

It allows of obtaining irreversible connections which are particularly simple, rugged and easily machined, in which the stresses may be transmitted through large surfaces of contact only slightly liable to wear. The irreversible connections being, according to the invention, distinct from the differential proper, forms of construction can be provided, on the other hand, in which they only intervene at will. In the case of a motor car differential, for instance, the latter may be rendered irreversible only on slippery ground, in such a manner that the wear of the irreversible connections is still further reduced.

On hard ground, the advantages of reversible differentials may moreover be obtained, particularly concerning the efficiency and better distribution of the stresses between the wheels.

However, the devices according to the invention do not have the inconveniences of the systems for locking the differential. They allow the vehicle to turn without inconvenience and have the advantage of being capable of being used preventively on ground which is slippery or of doubtful hardness.

According to the present invention, the irreversible connections distinct from the differential proper are interposed between a driven member and the corresponding sun-wheel or other equivalent member. They take a bearing on a casing rotatively rigid with the planet pinion-carrier, so that they intervene only in the transmission of secondary movements which may take place relatively to the main movement of the planet pinion-carrier or of any other equivalent driving member.

The irreversible connections connect two shafts (or other members) aligned according to the axis of rotation of the casing by compelling them to rotate when the movement is possible, in the same direction and at the same speed.

In the case of a motor car differential for instance, for the transmission of secondary movements only, either a connection irreversible in one direction can be interposed between each wheel and the differential, or two connections irreversible in reverse directions, or more simply a connection of double irreversibility, can be interposed between one of the wheels and the differential.

Whatever may be the method of carrying them out, the connections will be arranged in such a manner that one of the wheels cannot drive the other through the medium of said connections, but that the movement is possible if both wheels act in concordance by themselves on the connections.

It will not always be necessary for the connections to be completely irreversible and it suffices that they absorb the stresses in a suitable proportion. In the case of a motor car differential for instance, the irreversibility should be sufficient for reducing the torques to a value lower than the resistance to slipping of a wheel even on bad ground.

The irreversible connections can be obtained in any manner whatever, for instance by means of a worm cooperating with toothed wheels.

However, the invention more particularly relates to certain simple and rugged forms of construction, rendered possible by the particular arrangement of the connections interposed according to the invention between two aligned shafts rotating in the same direction and at the same speed.

Double irreversibility may for instance be very simply obtained by the friction caused by the reaction of the connection established between the two shafts on surfaces rendered rotatively rigid with the planet pinion-carrier and the casing of the differential, permanently or at will. In this case, the connection may be constituted by a coupling obtained by means of inclines of suitable slope.

A connection of double irreversibility may also be obtained relatively to the casing of the differential by interposing between complementary inclines respectively rigid with the sun-wheel and the driven member, one or more members capable of moving under the action of the inclines without being rotatively driven by the latter, at least about the same axis, in the same direction or at the same speed.

It is to be noted that the invention can apply to all mechanical, hydraulic, electric or other differentials.

Several forms of construction of a differential combined with an irreversible device according to the invention are illustrated, by way of example only in the accompanying diagrammatic drawings.

Fig. 1 is an axial section of a first embodiment.

Fig. 2 shows in section a modification of the coupling device.

Fig. 3 is an axial section of another form of coupling device.

Fig. 4 is a cross section made according to line IV—IV of Fig. 3.

Figs. 7 and 8 are axial sections of two other modifications.

Fig. 9 is a partial section made according to line IX—IX of Fig. 8.

Figure 5:
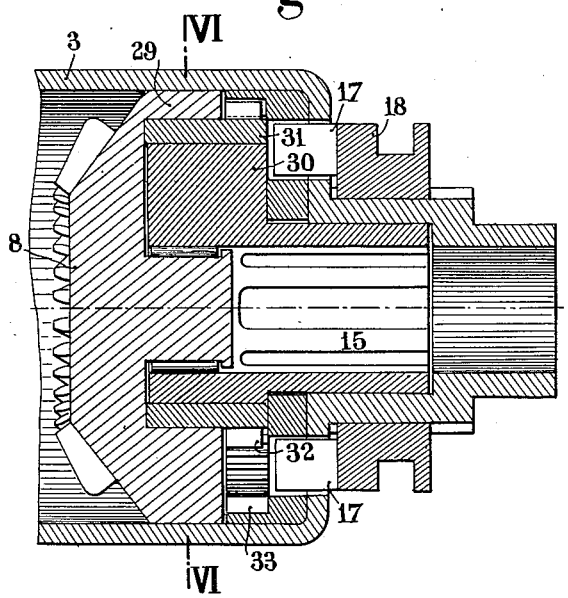
Fig. 5 is an axial section of another form of coupling device.

In these figures the driven shafts which are connected by the differential are not illustrated.

According to Fig. 1, the differential comprises a planet pinion-carrying casing made in two parts 2, 3, rendered rigid with the driving toothed crown wheel 4; said casing directly drives the spindle 5 on which the planet pinions 6 are loosely mounted; the latter mesh with two sun wheels 7 and 8 one of which is coupled by means of flutes 9 to one of the driven shafts and the other is rendered rigid through its hub with a disc 11 having on its face inclines 12 of small inclination. Against said disc 11 is placed a similar disc 13 having inclines 14 associated with the inclines 12, said disc 13 being coupled by means of flutes 15 to the second driven shaft.

Both discs 11 and 13 are enclosed with very slight play in a case 16 which is composed of two semi-cylindrical parts in order to allow the assemblage, both halves being held in juxtaposed position by the part 3 of the casing in which the whole is housed. The case 16 is so shaped as to prevent the members 11 and 13 from moving apart. It can be rendered rotatively rigid with the casing 2, 3 either permanently or only at will by means of claws 17 rigid with a sliding sleeve 18, or by any other suitable means.

The operation is as follows, assuming for instance that, by construction, the inclines 12, 14 have such a slope that a stress exerted by one of the driven shafts causes on the abutment surfaces such a pressure that the resistance produced by the friction exactly compensates the stress exerted.

First of all it will be seen that the reactions of one wheel on the other will always be absorbed.

With greater reason any movement will be impossible as long as the driven shafts will exert stresses of reverse directions.

On the contrary, in a turn, the wheels tending to rotate in reverse directions, the shafts will tend to rotate in one and the same direction. The torque tending to cause the discs 11 and 13 to rotate without the case 16 will be increased owing to the fact that both these discs will act in the same direction; on the other hand the pressure will tend to diminish. In these conditions the equilibrium of the driving forces and the friction forces being upset, the differential movement will take place until the outer wheel again resists.

It will generally be advantageous to provide, as shown in Fig. 1, inclines of the same direction, of constant inclination, and to multiply the changes of direction in order to reduce cumbersomeness.

In the case in which the device is applied to a vehicle one of the wheels of which under consideration may be liable to completely lift from the ground, a small spring might be provided between the discs 11 and 13 so as to initiate the clamping in all cases.

Discs or washers made of different metals or of friction materials may be interposed between the friction surfaces with a view of avoiding any seizing or of increasing the friction. In case of wear, it suffices to replace said washers for taking up the play.

The coupling may be obtained through the medium of balls interposed between suitable inclines of two discs replacing the discs 11 and 13 for instance as indicated in Fig. 2; 19 designates a ball interposed between the inclines 12a of the disc 11a and the inclines 14a of the disc 13a; the operation is the same as above stated.

On the other hand, in order to increase the friction for a given inclination of the inclines, the pressures can either be increased by giving a suitable inclination to the friction surfaces (the shape of a truncated cone for instance), or the friction surfaces can be multiplied by using for instance a plurality of discs alternately rigid with the case and the shafts.

Likewise, connections might be obtained producing no longer axial reactions, but radial reactions and tending for instance to clamp shoes on the rim of a drum rendered rigid with the casing either permanently or at will.

In Figs. 3 and 4 neither the part 2 of the casing, nor the planet pinion-carrier 1, nor the planet pinions 6, nor the sun wheel 7 have been illustrated, as they can be similar to those of Fig. 1.

The sun wheel 8 and the corresponding driven shaft (not shown) are connected by a coupling device comprising two discs 20 and 21, the first being rigid with the hub 10 of the sun wheel 9 and the second being adapted to be coupled to the respective shaft through the medium of flutes 15. The inner faces of said discs are inclined according to planes 22, 23 which are also oblique relatively to the axis of the differential. An intermediate disc 24, having both its faces parallel, is placed between the faces 22, 23 and freely mounted on a cylindrical boss 25 of disc

20. The unit composed of the three discs is enclosed with very slight play in an annular case 26 which is itself housed in the casing 3 and which can be rendered rotatively rigid with the latter either permanently, or only at will, by means of claws 17 rigid with a sliding sleeve 18.

The disc 24 is rotatively connected to the case by journals 27 arranged according to one of its diameters and freely engaged in grooves 28 provided in the case parallel to its axis.

When the apparatus is applied to motor cars, the driving of the wheels by the differential will take place normally as long as the vehicle runs straight ahead and on hard ground.

Owing to the slight obliquity of the inner face of the discs, the connections thus devised absorb completely, or at least in a sufficient proportion, the reactions of one wheel on the other so that the stresses tending to cause a wheel to rotate more rapidly than the casing will be neutralized or sufficiently reduced. However, in turns, the outer wheel tending to accelerate by itself, the shafts will exert stresses of reverse direction relatively to the casing 3 and to the planet pinion-carrier. The members 20 and 21 will act in this case, in cooperation on member 24 which will receive a movement of oscillation; the shafts coupled by the differential will rotate in reverse direction relatively to the casing 2 and will allow the differential movement of the wheels.

Figure 6:
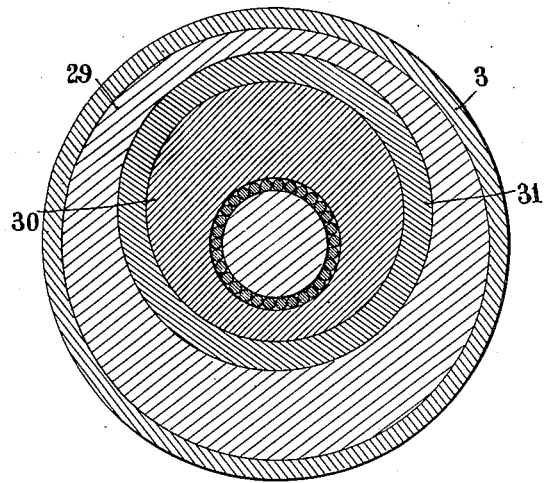
Fig. 6 is a cross section made according to line VI—VI of Fig. 5.

In the embodiment illustrated in Figs. 5 and 6, the coupling device comprises two eccentric sleeves 29 and 30 of different diameters and out of center relatively to the axis of the differential, the first of said sleeves is rigid with the sun wheel 8 and the second is adapted to be rendered rigid with the respective shaft through the medium of the flutes 15. Between said sleeves is fitted, with very slight play, an intermediate sleeve 31 the edge of which carries a circular set of teeth 32 meshing with a toothed wheel 33 which is housed in the casing 3 and which is concentric with the axis of the differential. Said wheel 33 is rendered rotatively rigid with the casing either permanently, or at the driver's will by means of claws 17, as in the preceding cases.

When the sleeves 29 and 30 exert concordant stresses on the member 31, the latter, simultaneously driven by said sleeves, can roll within the toothed wheel 33 connected to the casing 3. On the contrary, owing to the slight eccentricity, the wheel 31 cannot transmit to one of the sleeves 29 or 30 the rotation it is urged to receive from the other sleeves 30 or 29. It results therefrom that the effects due to the combination of this device with the differential are the same as in the preceding cases.

It is to be noted that the crown member 31 might be connected to the casing 3 in any manner other than by means of circular sets of teeth, for instance by means of a lateral finger rigid with the wheel 31 and sliding in a radial groove of the casing 3, or of a plurality of fingers moving in circular recesses formed in a coupling link, etc.

For compensating the wear of the friction surfaces of discs 11 and 13 or 20 and 21, or of the members 29, 30 and 31, a suitable conicity and a relative mobility in the axial direction can be provided.

In the embodiments according to Figs. 3 to 6, the intermediate member 24 or 31 might be replaced by several members such as push-pieces or balls capable of moving in slideways rigid with the casing 3; in this case the changes in direction of the inclines may be multiplied.

Fig. 7 shows an example of this kind in which the intermediate members are constituted by balls 34 placed between inclines 35, 36 provided on the opposite faces of a plate 37 rigid with the sun wheel 8 and a plate 38 rigid with the driven shaft 39; said balls are driven with the movement of the driving casing 3 by teeth 40 provided within the latter and between which they can only move parallel to the axis of rotation of said casing.

In the various embodiments illustrated, the irreversibility can be done away with at will, but it is obvious that it may be rendered permanent.

Said irreversibility is done away with when the friction surfaces are allowed to freely rotate. The same result might be obtained by directly coupling the two driven shafts by a second connection, for instance by means of dog-clutches, eliminating the reactions or the pressures on the irreversible connection which in this case will preferably have a certain amount of play.

An embodiment comprising such a coupling is shown in Figs. 8 and 9: in this case, the driven shaft 41 is hollow and carries a pinion 42 intended to transmit its rotation to the corresponding wheel of the vehicle through the medium of a suitable gearing. The friction coupling device between said shaft, the sun wheel 8 and the casing 3, is obtained by means of plates 43 and 44 respectively rigid with said sun wheel 8 and the shaft 41 and having on their opposite faces recesses with oblique faces 45 and 46 which enclose balls 47, held at an invariable distance apart by an annular ball-race 48; said plates are housed between the cheek members 49, 50 of a drum 51 which is rendered rotatively rigid with the driving casing 3 by splines 52. The operation of this mechanism is similar to that of the differential shown in Fig. 1 for instance. Moreover, the driven shaft 41 can be directly coupled to the sun wheel 8 by means of a spindle 53 sliding through the shaft 41 and rendered rotatively rigid therewith by means of splines 54. Said spindle comprises a circular groove 55 which allows of moving it by means of a fork not shown, so that the inner end of said spindle can engage a recess 56 also splined, of the hub of the sun wheel 8, this ensuring that the said sun wheel is rendered firmly rigid with the driven shaft 41, for instance when the vehicle is running over hard ground. The spindle 51 can be withdrawn from the hub of the sun wheel only when the vehicle is on slippery ground.

I claim:

1. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising members respectively rotatively rigid with said sun wheel and with said shaft and having opposed inclines, and a member adapted to be normally rotatively connected to the casing and cooperating with said members provided with inclines so as to be frictionally coupled with the latter or released therefrom according as they are urged to rotate relatively thereto at relative speeds of reverse directions or of the same direction, respectively.

2. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising members respectively rotatively rigid with said sun wheel and with said shaft and having opposed inclines, a member cooperating with said members provided with inclines and coupling means hand controlled for rotatively connecting the casing to the last-mentioned member, the latter being adapted to be frictionally coupled with said members provided with inclines or released from the latter according as they are urged to rotate relatively thereto at relative speeds of reverse directions or of the same direction, respectively.

3. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising members respectively rotatively rigid with said sun wheel and with said shaft and having opposed inclines, adapted to directly cooperate against each other and a member adapted to be normally rotatively connected to the casing and cooperating with said members provided with inclines so as to be frictionally coupled with the latter or released therefrom according as they are urged to rotate relatively thereto at relative speeds of reverse directions or of the same direction, respectively.

4. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising members respectively rotatively rigid with said sun wheel and with said shaft and having opposed inclines, and means cooperating with said members provided with inclines so as to prevent the whole of said members to be enlarged, said means being rotatively connected to said casing.

5. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising two juxtaposed discs rotatively rigid with said sun wheel and with said shaft respectively and having corresponding inclines on their adjacent faces, and a member in the shape of an annular case surrounding these two discs with very slight play, said case being normally rotatively connected to the casing and being frictionally coupled to said discs only when the whole of said discs is sufficiently urged to be enlarged by sliding one against the other under the action of different torques.

6. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising two juxtaposed discs rotatively rigid with said sun wheel and with said shaft respectively and having corresponding inclines on their adjacent faces, and a member in the shape of an annular case surrounding these two discs with very slight play and coupling means controlled by the driver for rotatively connecting said case with the casing and for releasing it at will, said case being frictionally coupled to said discs only when the whole of said discs is sufficiently urged to be enlarged by sliding one against the other under the action of different torques.

7. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising members respectively rotatively rigid with said sun wheel and with said shaft and having opposed inclines, means cooperating with said members provided with inclines so as to prevent the whole of them from being enlarged and a friction member placed between said members provided with inclines and normally rotatively connected to said casing.

8. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising two discs rotatively rigid with said sun wheel and with said shaft respectively, and having their inner face oblique relatively to the axis of the differential, a disc interposed between said inner faces and a member in the shape of an annular case surrounding the unit formed by these three discs with very slight play, said case being normally rotatively connected to the casing and also to said intermediate disc and being coupled to the three discs only when the latter tend to slide relatively to each other under the action of different torques, and the intermediate disc being rotatively connected to said case so as to rock about one of its diameters when it is free to rotate between the two other discs.

9. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising two sleeves of different diameters respectively rotatively rigid with said sun wheel and with said shaft, and out of center relatively to the axis of the differential, an intermediate member fitted with very slight play in the annular interval comprised between the two preceding sleeves, and means for connecting said casing and said intermediate member to that one compels the other to rotate in the same direction.

10. The combination of a driving rotary casing, two sun wheels serving to control the rotation of two driven shafts rigid with respective wheels, planet pinions which mesh with said sun wheels and which are caused to rotate with said casing, with coupling means between one of said sun wheels and the respective driven shaft, said means comprising two sleeves of different diameters respectively rotatively rigid with said sun wheel and with said shaft, and out of center relatively to the axis of the differential, an intermediate member fitted with very slight play in the annular interval comprised between the two preceding sleeves, and having a circular set of teeth, a toothed member housed in the casing and concentric with the axis of the differential, the two said toothed members meshing together, and coupling means controlled from the exterior for rotatively connecting the last toothed member to the casing and for releasing it at will.

11. In a control mechanism for two shafts, the combination of a differential having a driving rotary casing, two sun wheels rotatively mounted in said casing, planet pinions meshing with said sun wheels and which are caused to rotate with said casing, one of said sun wheels being invariably rotatively connected with the respective driven shaft and the latter being free to rotate substantially without friction relatively to the casing, and connecting means for coupling the second sun wheel to the other driven shaft, said connecting means comprising inclines of suitable slope and friction members respectively rotatively connected, some with the second sun wheel and with the respective driven shaft and the others with the casing, and adapted to absorb under the pressure of said inclines a definite proportion of the stresses transmitted from said wheel to said driven shaft and reversely.

12. In a control mechanism for two driven shafts, the combination of a differential having a driving rotary casing, two sun wheels rotatively mounted in said casing, planet pinions meshing with said sun wheels and which are caused to rotate with said casing, one of said sun wheels being invariably rotatively connected to the respective driven shaft, and the latter being free to rotate substantially without friction relatively to the casing and connecting means for coupling the second sun wheel to the other driven shaft, said connecting means comprising inclines of suitable slope and friction members respectively rotatively connected, some with the second sun wheel and with the respective driven shaft and the others with the casing, and adapted to absorb under the pressure of said incline a definite proportion of the stresses transmitted from said sun wheel to said driven shaft and reversely, and control means for putting said friction members out of action at will.

13. A control mechanism comprising the combination as claimed in claim 12 and in which the said friction members rendered rotatively rigid with the casing are distinct from the latter and mounted so as to be unclutched therewith and to then freely rotate.

14. A control mechanism comprising the combination as claimed in claim 12 and in which the auxiliary positive coupling means are provided for rendering rotatively rigid at will the second driven shaft directly with the respective sun wheel.

HENRI LEON MARIE JOSEPH DE PLACE.